Sept. 23, 1952           A. GROWER           2,611,380
TOILET KIT
Filed July 7, 1950
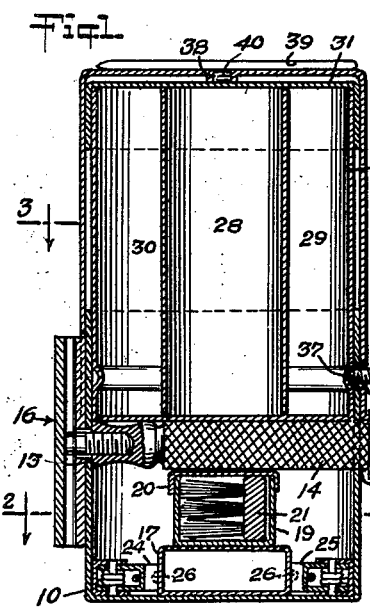
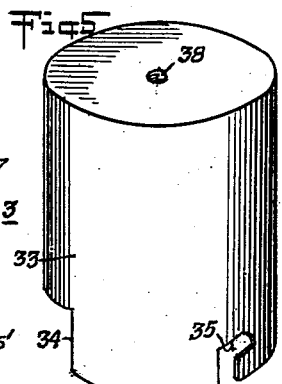
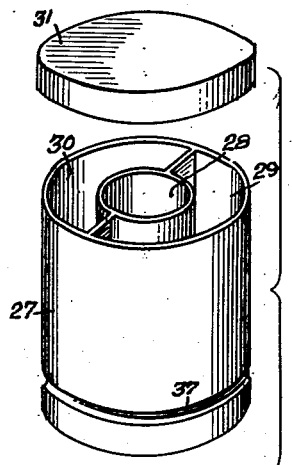
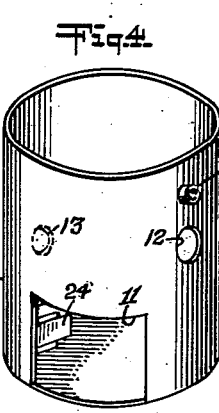
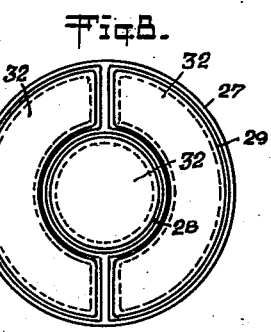
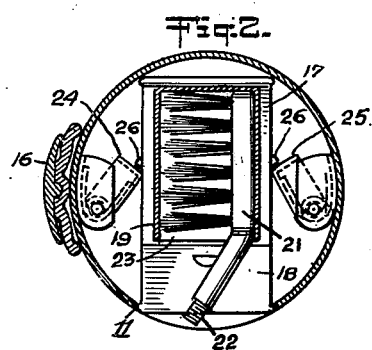
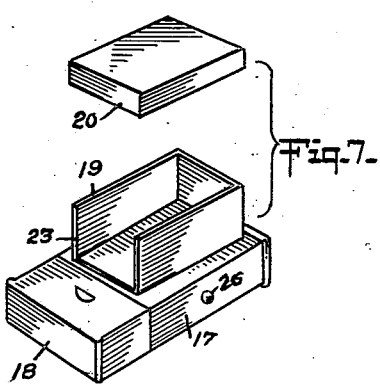
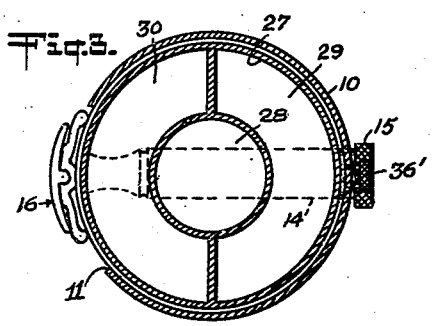
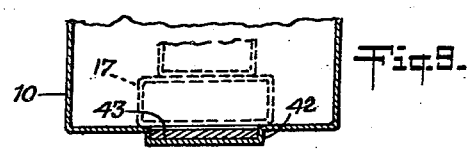
INVENTOR.
Abraham Grower
BY
Munn, Liddy & Glaccum
Attorneys Patented Sept. 23, 1952

2,611,380

UNITED STATES PATENT OFFICE 2,611,380

TOILET KIT

Abraham Grower, New York, N. Y.

Application July 7, 1950, Serial No. 172,475

9 Claims. (Cl. 132—80)

The object of the invention is to provide a simple, efficient, compact, durable kit which a traveler can place in his traveling bags to furnish him with all the necessary equipment for shaving and other toilet operations.

A further object is to provide a device which is composed of a few simple parts which can be economically manufactured and easily assembled and disassembled by the user.

Further and more specific objects, features and advantages will more clearly appear from a consideration of the detailed specification hereinafter set forth, especially when taken in connection with the accompanying drawings which illustrate a present preferred form which the invention may assume and which form part of the specification.

In brief and general terms, the invention comprises a casing closed at the bottom and open at the top and which is provided with opposed apertures to support a razor blade handle above the bottom thereof with the head of the razor disposed snugly along the outside wall of the casing. Below this handle, the casing is provided with an opening to receive a unit containing a package of razor blades and a toothbrush frictionally held in position on the bottom of the casing, or this unit may be held in the casing by other means such as by magnetic attraction.

A container for toothpaste, mouth wash, and shaving cream is snugly disposed into the top of the casing and is divided into compartments to receive these various materials. This container is provided with a snug cover. Over the top of the casing, and the inserted container, is disposed a tight-fitting cover which is slipped down over the top of the casing and has a bayonet and slot connection with the casing to hold it in tight relation thereto. This cover is cut away to embrace the head of the razor, and a stud on the casing rides in the bayonet slot and can be tightened to engage the outer wall of the container to hold it in position. The top of the cover is provided with a threaded aperture to permit a flat auxiliary element, such as a nail file, to be flatly related therewith to further increase utility of the device.

The present preferred form which the invention may assume is illustrated in the drawings of which, Fig. 1 is a vertical cross section through the device;

Fig. 2 is a horizontal cross section taken on the line 2—2 of Fig. 1;

Fig. 3 is a horizontal cross section taken on the line 3—3 of Fig. 1;

Fig. 4 is a perspective view of the main casing;

Fig. 5 is a perspective view of the cover therefor;

Fig. 6 is an exploded view of an inserted container for extra supplies;

Fig. 7 is an exploded view of a unit to be inserted into the bottom of the main casing;

Fig. 8 is a plan view of a modified form of inserted container; and,

Fig. 9 is a partial section showing the use of a magnetic means to hold the razor blade unit within and on the bottom of the casing.

Referring now merely to the specific forms of the invention shown in the drawings, it will be seen that the preferred form includes a cylindrical casing 10, closed at the bottom and open at the top. This casing is cut away just above the bottom wall as at 11 to permit the insertion thereinto of articles to be later set forth and with oppositely disposed apertures 12 and 13 at a higher level to receive the handle portion 14 of an ordinary safety razor. The flanged head 15 of this handle lies adjacent the outer wall of the casing 10 as shown in Fig. 1 and the opposite threaded end thereof extends to the opposite wall of the casing as shown in the same figure to receive the operating blade and associated plates numbered 16 and shown in this figure as disposed flat against the opposite outer wall of the casing 10.

Through the opening 11 at the side of the casing 10 at the bottom thereof, there is adapted to be inserted therein a container of blades 17 which has the usual slip cap 18 thereon. On top of this blade container 17 is welded, or otherwise securely fastened, a box 19 with a removable cap 20 adapted to contain a tooth brush 21 with a threaded stem 22 projecting from the open front wall 23 of the box 19 and which stem 22 may be cooperatively associated with the threaded end of the razor handle 14 to scrub the teeth when desired. The box 19 is so mounted on the container 17, that downward pressure on the box 19 will depress the top wall of this container to permit the cap 18 to be slipped off in the usual manner.

In order to hold the unit comprising the container 17 and the box 19 on the bottom of the casing 10, I have provided a pair of spaced spring pressed plates such as 24 and 25 of any suitable construction and design to press against the sides of the container 17 as it is inserted to hold it therein. Further, to hold the container and associated parts in position when inserted, I have provided the sides of the container with projecting tits 26 which, as shown in Fig. 2, will lie just beyond the adjacent portions of the spring pressed elements 24 and 25 when the box 19 and container 17 are disposed in their inserted position to make it more difficult for the unit to be removed from within the casing 10 without a definite withdrawing effort being exerted thereon.

With the razor thus housed, and the blades therefor, and the toothbrush, it becomes necessary to provide a simple means to house the toothpaste, the mouth wash, the shaving cream, and an added toilet element, such as a nail file, in connection with the apparatus thus far described. To house the mouth wash, the shaving cream, and the toothpaste, I have provided a cylindrical container 27 which is closed at the bottom and open at the top and is dimensioned to fit snugly into the top of the main casing 10. This container 27 is divided into separate compartments by suitable partitions. The compartments are 28, a central one which may house the shaving cream, and two surrounding semi-circular compartments 29 and 30 in which may be respectively disposed the toothpaste and the mouth wash. This container 27 is provided with a tight-fitting cover 31.

In a modified form of the invention, these separate compartments 28, 29 and 30, instead of being directly filled by the respective mentioned material, may be occupied by plastic containers generally indicated by the numeral 32 in Fig. 8 which are suitably shaped to fit the respective compartments and are themselves adapted to contain the material and therefore can be separately manufactured and filled and then disposed within the container 27 as and when desired.

A cover member is provided in the form of an inverted cylindrical cup-shaped housing 33 closed at the top and open at the bottom which can be slipped down over the top of the casing 10 to rest upon the ends of the razor handle 14 as shown in Fig. 1. The bottom wall of this housing 33 is provided with a cut-away portion 34 to embrace the head of the razor and is wide enough to permit a certain amount of turning movement of the housing. This turning movement is required since the housing 33 is provided with a bayonet slot 35 formed in the usual manner to cooperate with a hollow stud 36 disposed on the outside of the casing 10 near the top thereof as shown in Figs. 1 and 4 so that as the housing cap 33 is placed over the top of the main casing 10 the stud will enter the slot and the cap may be turned to wedge the top on the casing. A headed screw 36' is disposable in the bore of the stud 36, and the end of this screw is adapted to engage with the circular groove 37 in the outer wall of the container 27 to hold this container tightly in position.

To enable an additional element to be associated with this simple and compact kit, I provide a threaded aperture 38 in the top wall of the cover cap 33 and on the top of the cap I dispose a flat element, such as a nail file, 39, which on one side has a threaded associated stud or stem 40 which can be screwed into said opening to hold the file flat against the top of the cover.

It will thus be seen that the device herein comprises a main casing in which is supported a safety razor unit and is further provided with means for the compact housing of razor blades and toothbrush in the bottom thereof. The disposition of toothpaste, shaving cream, and mouth wash, with respect to this unit, is provided for by having a compartmented container adapted to be snugly inserted in the top of the main casing. This compartmented container has a snug-fitting cap.

The unit is further provided with a snug-fitted cover which can be slipped down over the top of the casing and the enclosed container, and is related thereto by bayonet and slot connections to form a tight connection. The bayonet pin may be adjusted to press against the compartmented container to hold it in position.

In the modified form of the compartmented container, the various materials normally disposed therein may be housed or contained in separate, preferably plastic, casings shaped to fit into the various compartments.

A further modification is shown in Fig. 9 in which the unit comprising the containers for the razor blades and the toothbrush are slipped into the bottom of the casing 10 and the bottom of this casing is provided with an offset recess 42 in which is disposed a magnetic plate 43, the top surface of which lies slightly below the level of the bottom of the case. When the metal blade container 17 is inserted in the bottom of the casing, it will be attracted to this magnetic plate and will be held by this attraction in its inserted position. This modification may be used as an alternative means for holding the unit in the casing instead of the friction plates shown in Fig. 2.

After a careful consideration of the specification and the drawings, it will be clearly apparent that there is provided a compact, efficient, convenient unit the parts of which, each in turn, cooperate, to form this unit. The handle 14 of the razor extends across within the casing 10 to act as a support for the bottom of the container 27; it also acts as a spacer between the container 27 and the casing unit disposed therebelow and containing the tooth brush and the razor blades; the cover 33 cooperates to hold the cover 31 of the container 27 in place and, by latching with the outside of the casing 10 by bayonet and slot means, all the parts are held firmly in relative position when not in use.

While the invention has been described in detail and shown with respect to the accompanying drawings, it is not to be limited to such details, since many changes and modifications may be made in the invention without departing from the spirit and scope thereof. Hence, it is desired to cover any and all forms and modifications of the invention which may come within the language and scope of any one or more of the appended claims.

I claim:

1. A toilet kit which comprises a casing having a closed bottom and an open top, said casing having opposed apertures in its side walls above the bottom, a safety razor having a detachable handle and supported on said casing in said apertures, the head of the razor disposed in snug relation against the outer wall of the casing on the end of the handle.

2. A device according to claim 1, in which the casing has a lateral opening just above the bottom wall, and a blade and toothbrush unit inserted into said opening to be disposed on the bottom of the casing below the razor blade handle the handle being closely adjacent the top of the unit and acting as a spacer between the top of the unit and the remainder of the casing.

3. A device according to claim 2 in which there are disposed resilient pressure means on the bottom of the casing to engage the side walls of the inserted unit to hold it in place.

4. A device in accordance with claim 2 in which there is disposed a magnetic element in the bottom wall of the casing to magnetically attract the inserted unit and hold it in inserted position.

5. A device according to claim 3 in which the sides of the unit are provided with projecting tits to lie beyond the resilient pressure means when the unit is in inserted position to further hold the unit in position.

6. A device according to claim 1 further including a compartmented container to be snugly disposed in the top of the casing and provided with separate compartments for shaving cream, mouth wash, and toothpaste, and a snug cover for said container the bottom of the container adapted to be supported upon the razor handle.

7. A device according to claim 6 in which there is provided a cap to be disposed over the casing and the container, and provided with a bayonet slot construction to cooperate with a set screw on the casing to hold the cover in place the cap thus latched to the casing holding the parts within securely in relative position.

8. A device in accordance with claim 7 in which the container has a peripheral groove, into which the end of the set screw may extend to tighten the container in position.

9. A device according to claim 7 in which the lower edge of the cap cover is cut away to embrace the head of the razor unit disposed against the outer wall of the casing.

ABRAHAM GROWER.

REFERENCES CITED

The following references are of record in the file of this patent:

UNITED STATES PATENTS

| Number | Name | Date |
|---|---|---|
| 1,255,061 | Smith | Jan. 29, 1918 |
| 1,529,316 | Lovegrove | Mar. 10, 1925 |
| 1,708,745 | Tipton | Apr. 9, 1929 |
| 1,887,124 | Flintermann | Nov. 8, 1932 |

FOREIGN PATENTS

| Number | Country | Date |
|---|---|---|
| 407,002 | Great Britain | Feb. 24, 1934 |
| 622,375 | Germany | May 6, 1934 |